A. F. MASURY.
SUPPORT FOR MOTOR TRANSMISSION CASINGS.
APPLICATION FILED JUNE 21, 1917.

1,266,537.

Patented May 14, 1918.

WITNESS:

INVENTOR
Alfred F. Masury
BY
Redding, Greeley & Goodlett
ATTORNEYS

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

SUPPORT FOR MOTOR TRANSMISSION-CASINGS.

1,266,537.

Specification of Letters Patent.

Patented May 14, 1918.

Application filed June 21, 1917. Serial No. 176,044.

*To all whom it may concern:*

Be it known that I, ALFRED F. MASURY, a citizen of the United States, residing in the borough of Manhattan of the city of New York, in the State of New York, have invented certain new and useful Improvements in Supports for Motor Transmission-Casings, of which the following is a specification, reference being had to the accompanying drawings, forming a part hereof.

This invention relates to improvements in a support for the transmission casing of motor vehicles and is concerned particularly with the improvement of such supports in motor trucks in which several factors of construction render the present improvements of especial advantage. In motor trucks the frame members are usually relatively long from front to rear and yet are supported in such a way that the maximum degree of flexibility under twisting and bending strains will be afforded during the hard and rough service to which such trucks are placed. In such trucks, it is also true that the transmission shaft extending from the motor up to the rear axle is also supported from the frame with some degree of flexibility so as to compensate for the twisting strains. These conditions in motor trucks make it especially desirable that the transmission casing in which are disposed the change-speed gears should itself be supported flexibly with relation to the side frame members so that the twisting and bending strains thereon will not be transmitted directly to said casing in such a way as to tend to injure it. Again, the very requirements of flexibility of the frame members make it desirable that this transmission casing shall be so supported upon the frame members as to permit their free flexing and shall not serve as a fixed permanent strut tending to prevent such flexibility. The present invention takes into account the actual conditions noted briefly and provides a support for the transmission casing from the side frame members which is of such character as to permit free flexibility of the frame members and relative flexibility between such frame members and the casing, so that all twisting and bending strains transmitted to the casing from the side frame members are entirely compensated for. In accordance with the invention the casing is supported transversely on the side frame members at three points, one of these points at least being a form of universal union. One practical embodiment of the invention will be described in detail in connection with the accompanying drawings, in which—

Figure 1:
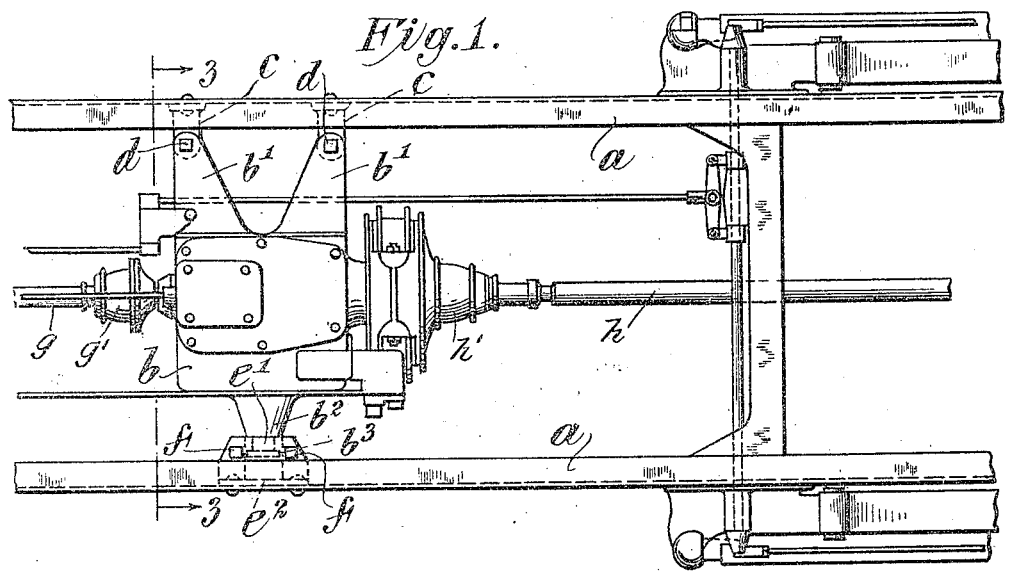
Figure 1 is a view in plan of so much of a motor truck as is necessary for an understanding of the association of the improved support therewith.
Figure 2:
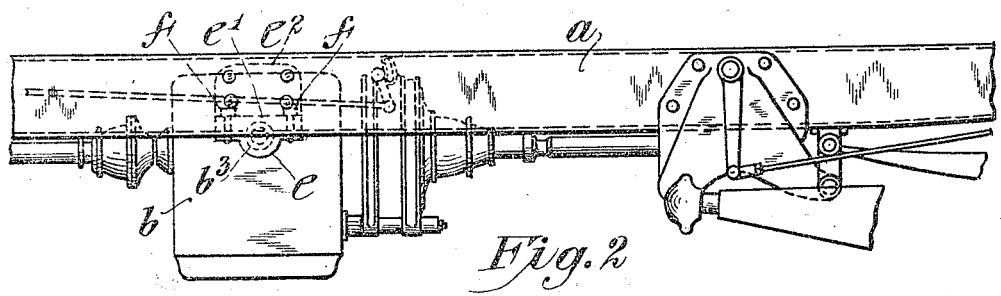
Fig. 2 is a view in side elevation of so much of the truck as is shown in Fig. 1.
Figure 3:
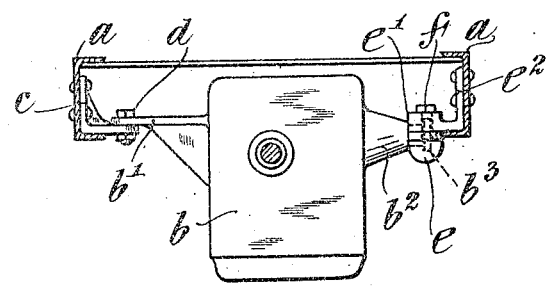
Fig. 3 is a sectional view through the chassis taken on the plane indicated by the line 3—3 of Fig. 1 and looking in the direction of the arrows.

The side frame members $a$ which may be channeled, as usual, support the transmission casing $b$, which is of such form and construction as to extend transversely across the chassis between the side frame members and be connected therewith. It is the usual practice to provide special struts or frame members on which the transmission casing may be supported and, generally considered, this transmission casing may be said to usually extend longitudinally of the chassis. In the improved construction the transmission casing has its supporting devices embodied therein and extends transversely between the side frame members, these supporting devices, as will be described, being connected directly to such members. As shown in plan, in Fig. 1, the casing $b$ is preferably cast at one side with flanges $b'$ which extend to one of the frame members $a$. These flanges might, of course, be secured directly to the channeled members $a$, but as shown in Fig. 3, it may be better practice to connect the flanges $b'$ with suitable auxiliary brackets $c$ secured directly within the channeled member $a$. The connection between the transmission casing at this side, with the side brackets $c$, may be by means of bolts $d$ passing through the flanges and their respective brackets. These flanges $b'$, it will be noted, extend generally from the front and rear edges of the transmission casing to the side frame member. At the other side of the transmission casing $b$, is the third supporting point for the casing, shown as a trunnion $b^2$ which may also be cast integral with the casing and formed at its end with a circular flange $b^3$. This trunnion $b^2$ may rest in a bearing $e$, recessed to receive the trunnion, and this bearing may include a cap section $e'$ formed integral with a bracket $c^2$ which rests in the other side frame member $a$. The two sections of the split bearing may be united detachably by means of bolts $f$. The bearing thus formed with the cap section and the complementary section may be enlarged interiorly to receive the curved flange $b^3$ formed at the end of the trunnion $b^2$, this flange being of greater diameter than the bearing portion proper of the trunnion. The connection thus established between the trunnion and the supporting bracket $c^2$ at this point is in the nature of a flexible universal union. The trunnion $b^2$ extends from the side of the casing at a point about its mid-section, so that the three points of support of the casing create, generally speaking, a triangle. The enlarged curved flange at the end of the trunnion $b^2$ holds the trunnion securely and yet flexibly against axial displacement in the bearing $e$.

It will be observed that the transmission casing is supported directly upon the side members of the chassis frame, independent of the engine, between the engine shaft or front transmission shaft $g$ and the rear transmission shaft $h$, both of which are flexibly supported at their ends adjacent the transmission casing by the usual universal joints indicated at $g'$ and $h'$.

From the description given, it will be evident that the three point support for the casing insures absolute flexibility therefor and permits ready flexing of the side frame members without the direct imposition of injurious stresses on the body of the casing itself. Torsional stresses of all kinds are also compensated for by the universal connection between the trunnion and the side frame members.

The disposition of the transmission casing transversely of the chassis has also been found advantageous when the improved support is employed since it not only insures the flexibility described, but is more compact than former constructions in which the transmission casing extends longitudinally of the chassis.

Changes in the details of the improved casing and support, such as in the form and relative disposition of the supporting flanges and trunnion and also in the manner of uniting these elements with the side frame members, may be made by a skilled mechanic without departing from the spirit of the invention provided the described results are attained in the manner herein suggested.

I claim as my invention:

1. In a motor vehicle, in combination with the side frame members, a transmission casing extending transversely of the frame members and provided with means to support it flexibly and directly on the side frame members at three points independently of the engine support and front and rear transmission shafts flexibly supported on said casing.

2. In a motor vehicle, in combination with the side frame members, a transmission casing extending transversely of the frame members, two spaced flanges carried at one side of the casing, and a trunnion carried at the other side of the casing for connection with the respective frame members.

3. In a motor vehicle, in combination with the side frame members, a transmission casing extending transversely of the frame members, two spaced flanges cast integral with one side of the casing, a trunnion cast integral with the other side thereof and a bearing to receive the trunnion for universal support therein.

4. In a motor vehicle, in combination with the side frame members, a transmission casing extending transversely of the frame members, two spaced flanges cast integral with one side of the casing, brackets on one of the side frame members, bolts to secure said flanges to the brackets, a trunnion cast integral with the other side of the casing, a bearing bracket for the trunnion having a detachable cap carried on the second frame member, and a flange on the end of the trunnion engaged by the bearing to hold the trunnion against axial movement while permitting universal movement.

This specification signed this 19th day of June, A. D. 1917.

ALFRED F. MASURY.